US008037185B2

United States Patent
Steinder et al.

(10) Patent No.: US 8,037,185 B2
(45) Date of Patent: *Oct. 11, 2011

(54) DYNAMIC APPLICATION PLACEMENT WITH ALLOCATION RESTRICTIONS, VERTICAL STACKING AND EVEN LOAD DISTRIBUTION

(75) Inventors: Malgorzata Steinder, Fort Lee, NJ (US); Alexei Karve, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 458 days.

This patent is subject to a terminal disclaimer.

(21) Appl. No.: 12/192,383

(22) Filed: Aug. 15, 2008

(65) Prior Publication Data

US 2010/0042721 A1 Feb. 18, 2010

Related U.S. Application Data

(63) Continuation of application No. 11/487,744, filed on Jul. 17, 2006, now Pat. No. 7,877,755.

(60) Provisional application No. 60/702,307, filed on Jul. 25, 2005.

(51) Int. Cl.
*G06F 15/16* (2006.01)
(52) U.S. Cl. ........................................ 709/226; 709/220
(58) Field of Classification Search .................. 709/226, 709/220
See application file for complete search history.

(56) References Cited

U.S. PATENT DOCUMENTS

| | | | |
|---|---|---|---|
| 6,327,622 B1 | 12/2001 | Jindal et al. | |
| 6,601,084 B1 | 7/2003 | Bhaskaran et al. | |
| 7,028,302 B2 | 4/2006 | Kiick | |
| 7,062,768 B2 | 6/2006 | Kubo et al. | |
| 7,287,121 B2 | 10/2007 | Horn et al. | |
| 7,788,671 B2 | 8/2010 | Black-Ziegelbein et al. | |
| 2003/0084155 A1* | 5/2003 | Graupner et al. | 709/226 |
| 2005/0033844 A1* | 2/2005 | Andrzejak et al. | 709/226 |
| 2005/0160429 A1 | 7/2005 | Hameleers et al. | |
| 2006/0242647 A1 | 10/2006 | Kimbrel et al. | |
| 2006/0288346 A1 | 12/2006 | Santos et al. | |

* cited by examiner

*Primary Examiner* — David Lazaro
(74) *Attorney, Agent, or Firm* — Cantor Colburn LLP; Vazken Alexanian

(57) ABSTRACT

A solution to a variant of a class constrained multiple knapsack problem. Previous solutions require that memory demand of every application be identical and do not consider minimizing placement changes. Previous techniques do not consider optimizing placement to improve load balancing as is described subsequently. Thus, the present invention provides systems, methods and apparatus, encapsulated in software, to provide the dynamic placement of application instances on a heterogeneous cluster of server machines. It depends on the existence of a visible and controllable platform, systems management and other business services that signal events and accept commands. It provides dynamically placing applications on servers such as to maximize a total amount of satisfied application demands, minimize a number of placement changes from a current placement, and minimize imbalance of load distribution of said applications on said at least one server.

36 Claims, 6 Drawing Sheets

DYNAMIC APPLICATION PLACEMENT WITH ALLOCATION RESTRICTIONS, VERTICAL STACKING AND EVEN LOAD DISTRIBUTION

CROSS-REFERENCE TO RELATED APPLICATIONS

This application is a continuation of U.S. patent application Ser. No. 11/487,744, filed Jul. 17, 2006 now U.S. Pat. No. 7,877,755, which claims priority to U.S. Provisional Application Ser. No. 60/702,307, filed Jul. 25, 2005, the contents of which are hereby incorporated by reference herein in their entirety.

FIELD OF THE INVENTION

The present invention relates to methods and apparatus to provide dynamic placement of application instances on a cluster of servers.

BACKGROUND OF THE INVENTION

In recent years, the development, deployment, and life-cycle management of Internet services have been greatly simplified by the development of middle-ware platforms which provide several functions including monitoring, load balancing, access control, and inter-operability across business units. Some of the middle-ware platforms also provide clustering functionality that enables the creation of collections of servers that provide a common set of replicated services. In order to utilize available resources in the most efficient manner it is best to allocate them to services dynamically according to their oscillating requirements.

To address this challenge application-server middle-ware may be extended with the ability to dynamically allocate resources to services through dynamic application placement. This invention concerns an algorithmic technique that allows the efficient computation of an application placement according to several optimality criteria that meets server capacity constraints. The proposed technique incorporates restrictions with regard to the mapping of applications to servers, allows multiple copies of the same application to be started on a server, and produces placement that allows the applications' load to be evenly distributed across servers.

The proposed approach differs from prior art in the following areas. Prior techniques assume that an application that has been placed on a server can utilize the entire server capacity in the presence of sufficient load. See M. Steinder, A. Tantawi, B. K. Martin, M. Spreitzer, G. Cuomo, A. Black-Ziegelbei, "On Demand Application Resource Allocation Through Dynamic Reconfiguration of Application Cluster Size and Placement", a patent application filed Oct. 6, 2004, in the USPTO assigned Ser. No. 10/978,944, which is incorporated herein by reference in entirety for all purposes. In practice, applications have internal bottlenecks that prevent them from utilizing the entire server power.

For such applications it may be beneficial to start multiple instances in a single node. The proposed technique allows the amount of CPU power that is allocated to a single instance to be limited. Prior techniques focus on maximizing the amount of resource demand satisfied by the resulting placement. While this objective remains the primary concern, focusing only on this requirement results in application placements that allow only unbalanced load distribution, in which some servers are 100% utilized while others have little or no load on them. Unbalanced load distribution affects application performance and is not reasonable as resource management feature. The proposed technique maximizes the amount of satisfied demand while also producing an application placement that allows a balanced load distribution. Placements that allow load to be balanced across servers provide better performance, are more resilient to server failures, and better tolerate workload spikes.

An example method provides placement of applications on a cluster of servers to facilitate load balancing. The method includes the steps of: obtaining a current placement of applications, computing a suggested new placement of applications, and modifying the suggested placement by computing and replacing a set of (application, server of origin, destination server) triples such that moving an application in each triple from its server of origin to the destination server will maximize the utility of the final placement.

SUMMARY OF THE INVENTION

The present invention provides a solution to dynamically place a set of applications on one or more servers. The present invention relies on the knowledge of application demands and resource capacities categorized as either load-dependent or load-independent. The calculated placement is such that the total amount of satisfied application demands is maximized, the number of placement changes compared to the current placement is minimized and the resultant placement allowed for the best load distribution. The calculated placement is also such that the amount of load dependent and load independent capacity consumed by applications placed on a server does not exceed the overall load dependent and load independent capacity of the server. The method respects allocation restrictions defined for any application on any server and allocation limits also defined for any application on any server. Thus, the present invention provides systems, methods and apparatus, encapsulated in software, to provide dynamic placement of application instances on a heterogeneous cluster of server machines. It depends on the existence of a visible and controllable platform, systems management and other business services that signal events and accept commands.

An example application placement method dynamically places applications on servers such as to: maximize a total amount of satisfied application demands, minimize a number of placement changes from a current placement, and minimize imbalance of load distribution of said applications on said at least one server.

BRIEF DESCRIPTION OF THE DRAWINGS

The aspects, features and advantages of the present invention will be apparent to one skilled in the art, in view of the following detailed description taken in combination with the attached drawings, in which.

DESCRIPTION OF THE INVENTION

The present invention provides a solution to a variant of a class constrained multiple knapsack problem. A previous solution requires that memory demand of every application be identical and it does not consider minimizing placement changes. Previous techniques do not consider optimizing placement to improve load balancing as is described subsequently. Thus, the present invention provides systems, methods and apparatus, encapsulated in software, to provide the dynamic placement of application instances on a heterogeneous cluster of server machines. It depends on the existence of a visible and controllable platform, systems management and other business services that signal events and accept commands. In some applications, the cluster of servers may include only one server.

Figure 1:
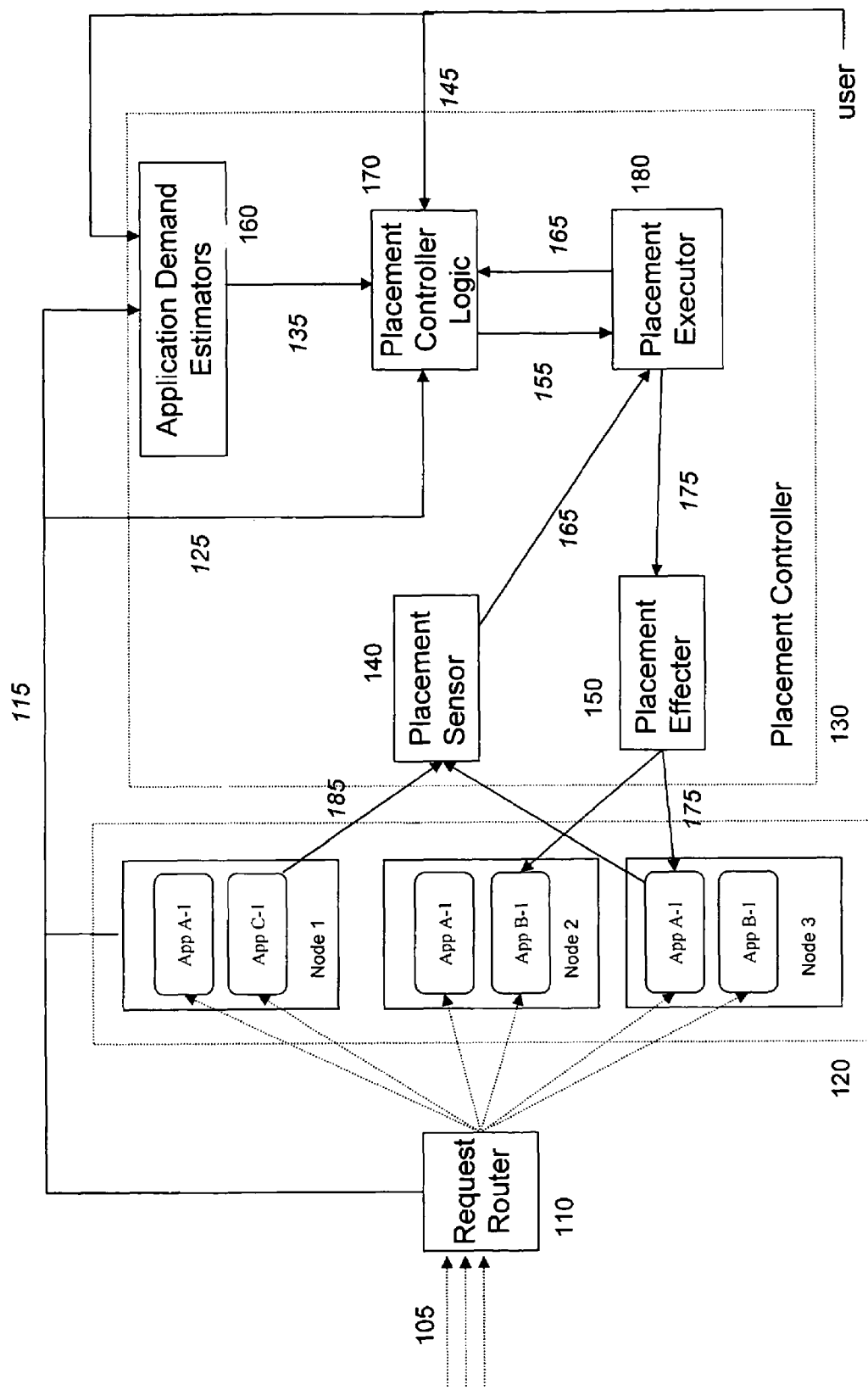
FIG. 1 illustrates an architecture of a management system that dynamically places applications on a cluster of servers.

FIG. 1 shows a typical architecture of a datacenter when dynamic placement can be applied. In the typical architecture of a datacenter, requests are admitted to the datacenter via a tier of layer 7 routers, one of which is shown in FIG. 1 (110). Request routers forward requests (FIG. 1, 105) to backend servers (FIG. 1-120) that execute the requests. The routers usually implement a load balancing mechanism with various objectives, e.g., equalizing server utilization across backend servers, equalizing response times for requests served by instances of the same application on different servers, etc.

Application placement problem is to control instances of which applications execute on servers within some or all of the backend tiers. FIG. 1 also shows an example implementation of the management system that dynamically controls the application placement. The management system relies on the availability of application demand estimators (160), which obtain application resource requirements based on observed workload intensity and resource usage (115). Given system configuration (145), and based on the resource requirements (135), current placement (165) and observed system capacity (125), the placement controller calculates the optimal placement of application instances on a set of servers. The calculation logic is performed by the optimization component of the management system (170). The new calculated placement (155) is then put into effect by placement executor (180), which implements the placement using placement effectors (150) in the form of start and stop operations (175). The status of initiated actions is observed using placement sensors (140) that monitor the status of applications on servers (185).

Figure 2:
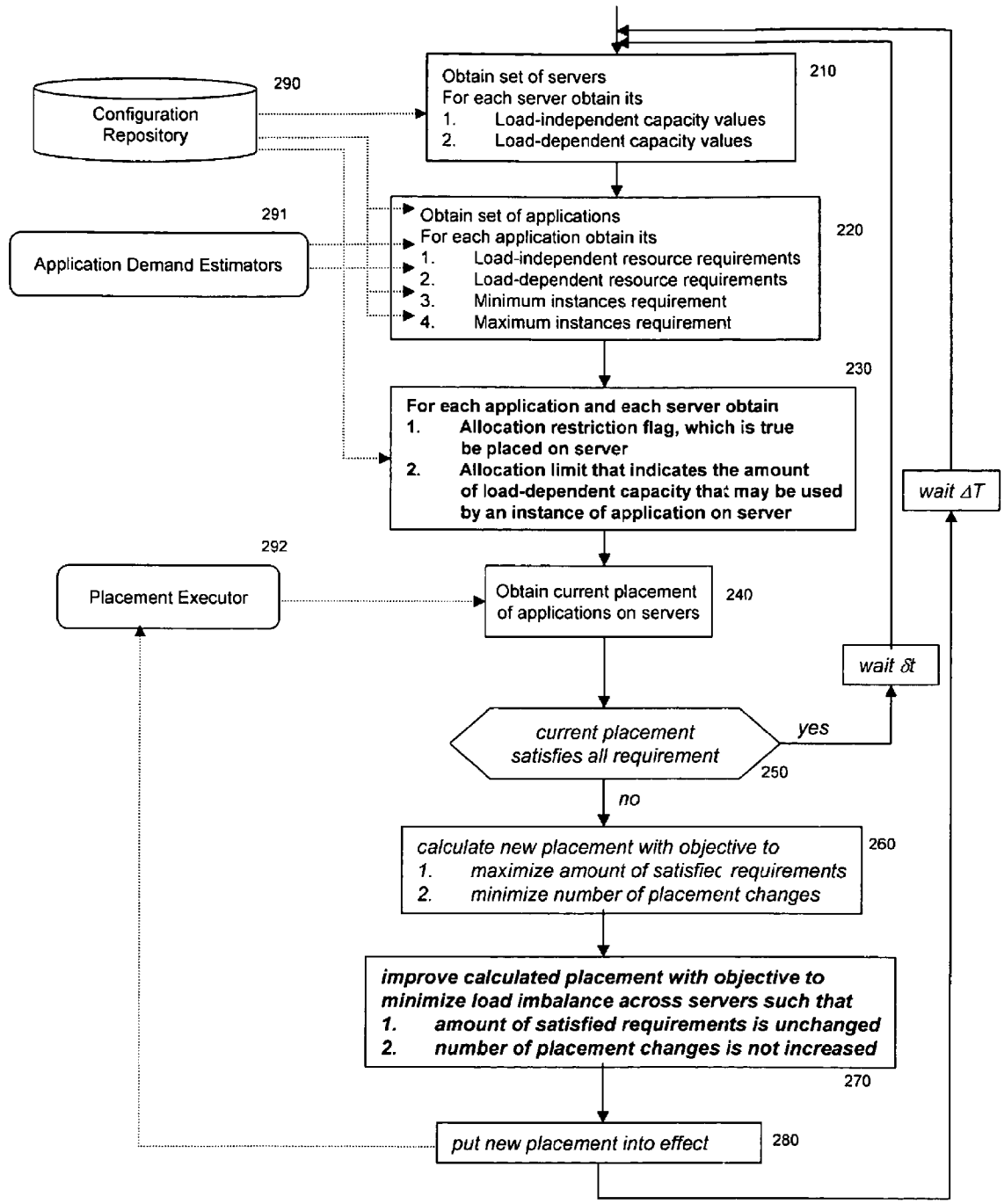
FIG. 2 illustrates a flow control diagram of application placement controller.

The subject of this invention is the functionality of the Placement Controller Logic (170). Placement Controller considered in this invention executes a time-out driven control loop shown in FIG. 2. In each control cycle, the controller obtains the set of servers currently available in the system, and their load-dependent and load-independent capacity values (210). This configuration inputs are obtained from a configuration repository (290). Load-dependent capacity corresponds to, for example, CPU speed of a server, while load-independent capacity corresponds to, for example, server memory.

In an example embodiment, the invention provides a method for dynamically placing applications on a cluster of servers. The cluster may include one or more servers. The achievement of the method are:

maximization of a total amount of satisfied application demands, minimization of a number of placement changes from a current placement, and minimization of imbalance of load distribution of the applications on the cluster of servers.

The method includes the steps of:

obtaining the current placement of the applications;

computing a suggested new placement that maximizes the total amount of satisfied demands while minimizing the number of placement changes;

modifying the suggested new placement in forming an updated placement to minimize the imbalance of load distribution of the applications without lowering the total amount of satisfied demands and without increasing the number of placement changes; and executing placement changes on the current placement to effect the updated placement. In some embodiments of the method, the method includes computing a set of placement changes needed to convert the current placement into the updated placement.

Referring back to FIG. 2, in each control cycle, the controller also obtains the set of applications deployed to the system with their configured policies with respect to the minimum and maximum numbers of instances that should be running in the system (220). These inputs are obtained from the configuration repository (290). In addition, the controller also obtains the load-dependent and load-independent resource requirements (220) from application demand estimators (291).

Furthermore, the controller obtains a matrix of allocation restrictions flags, which for each application and each server indicate whether the application may be places on the server (230). Also, for each application and each server, the controller obtains the maximum amount of load-dependent demand that may be used by a single instance of an application on a server (230). This allocation limit represents the fact that certain applications cannot use a full capacity of any server even under very high workload intensity due to their internal bottlenecks. The step of obtaining the allocation restrictions and allocation limits is a new element of the technique compared to prior art. Finally, the controller obtains the current placement matrix (240) using sensors of placement executor (292).

Given all the inputs, the controller first determines (in step 250) if the current placement as obtained in (240) can satisfy the entire demand obtained in (220) while meeting allocation restrictions and allocation limits obtained in (230). If so, then the control cycle resumes from (210) after a certain configured delay. If not then new placement is calculated such that the amount of satisfied load-dependent demand is maximized, and the number of placement changes compared to the current placement is minimized (260). Afterwards, the calculated new placement, called henceforth a suggested placement, is improved by modifying it in order to minimize load imbalance across nodes (270). This objective is achieved without violating optimization results already achieved in step 260. The step of improving the suggested placement to facilitate better load balance is a core invention of the present technique. The improved placement is then put into effect (280) by placement executor (292). Afterwards, the control loop resumes from (210) after a configured delay.

The step of calculating the suggested placement (260) may be based on a prior art technique, herein referred to as the incremental algorithm, suggested by, A. Tantawi, M. Steinder, T. Kimbrel, and M. Sviridenko, in "Dynamic Application Placement Under Service and Memory Constraints", a patent application filed in the USPTO assigned Ser. No. 11/110,766, which is modified with respect to allocation restrictions and allocation limits, and is incorporated herein by reference in entirety for all purposes.

Figure 3:
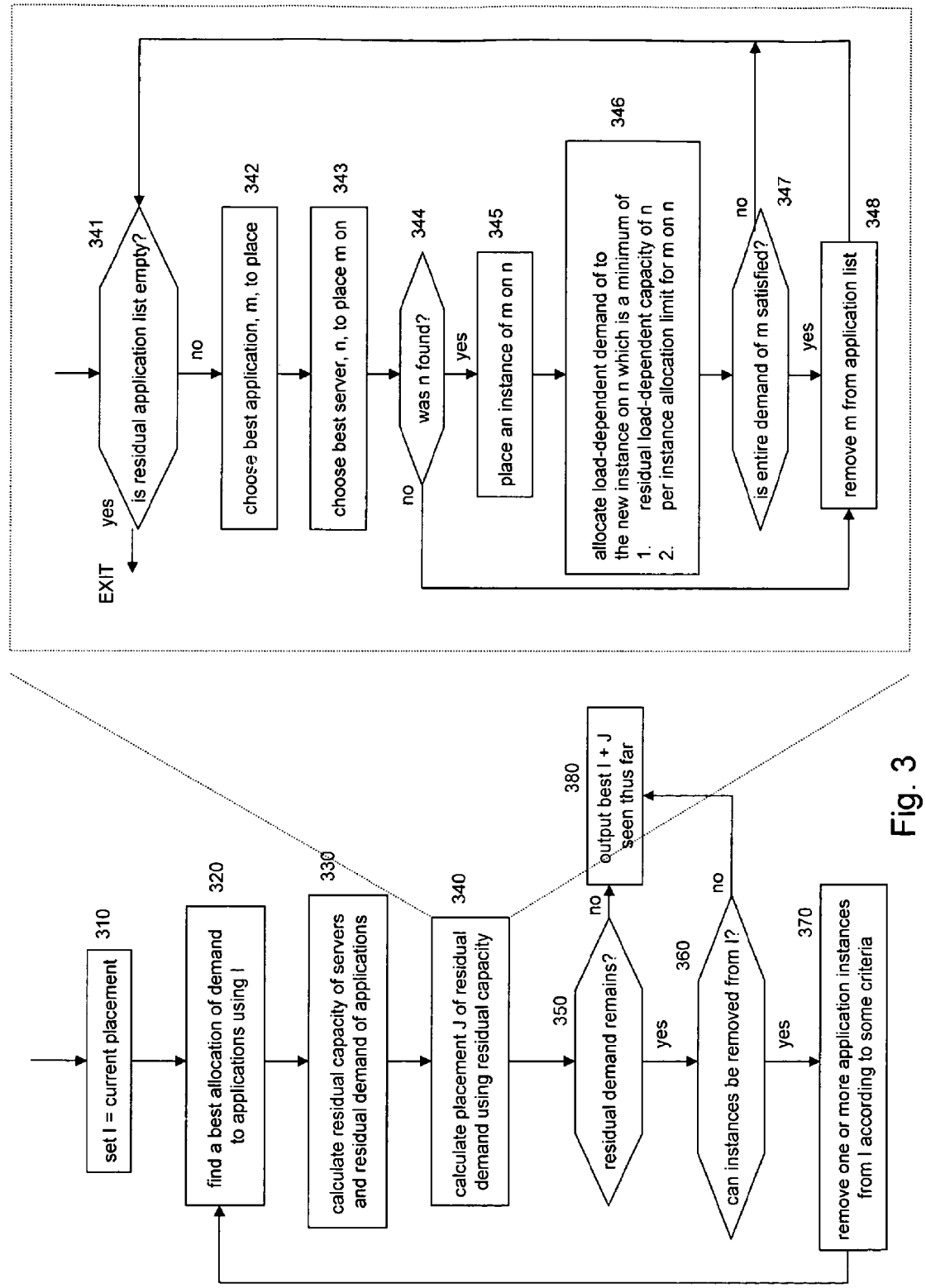
FIG. 3 illustrates an outline of a placement algorithm.

An outline of the modified technique is illustrated in FIG. 3. First, placement variable I is initialized to current placement (310). Then the best possible allocation of demand using placement I is calculated (320). Residual (unsatisfied)

demand of applications is calculated and residual (unused) capacity of servers is calculated (330). Then a separate procedure is executed to obtain the best possible placement J of applications with outstanding residual demand on the set of servers with residual capacity (340). If after J is calculated there is no residual demand remaining (350) the union of I and J is returned as a solution (380). Otherwise, it is checked whether any instances in I could be removed from it (360). If not, the best union of I+J seen thus far is returned (380). Otherwise, one or more eligible instances are removed from I (370) and the algorithm proceeds to the next iteration.

To calculate the best placement of residual applications using the residual server capacity, the following loop is executed. First, check whether any applications with residual demand remain (341). If not, the procedure completes. Otherwise, the best application is chosen from the list of applications with non-zero residual demand (342). Then, the best server is chosen on which to place the application (343). To observe allocation restrictions, only a server on which the application is allowed to run may be returned in this step. If no suitable server is found (344), application is removed from the list (348). If a suitable server is found, the application is placed on it (345), and some or all of its residual demand is allocated to in from the residual capacity of the server (346). To observe allocation limits, the amount of demand of the application that is allocated to it after placing a new instance in step (345), is capped by the allocation limit for this application and server. Finally, if after step (346) no residual demand remains for the application, the application is removed from the list (348). Then the procedure proceeds to the next iteration.

We formally formulate the placement problem as follows. We are given a set of servers, $N=\{1, \ldots, N\}$ and a set of applications $M=\{1, \ldots, M\}$. With each server n we associate its load-independent and load-dependent capacities, $\Gamma_n$ and $\Omega_n$, which correspond to the server's memory and CPU power, respectively. With each application, we associate its load-independent and load dependent demand values, $\gamma_m$ and $\omega_m$, which correspond to the application's memory and CPU requirements, respectively.

With each application we also associate the following parameters:

The minimum number of instances that must be started for the application, $\min_m$ The maximum number of instances that may be started for the application, $\max_m$ The Boolean flag managed$_m$ indicating whether instances of the application can be started or stopped by the placement controller.

With each application and each server we associate the following parameters:

Allocation restriction flag, $R_{mn}$ indicating whether an instance of the application m may be started on server n Allocation limit for application m instance on server n, $\pi_{mn}$ that indicates the maximum amount of CPU power that can be used by a single instance of application m on server n.

Figure 4:
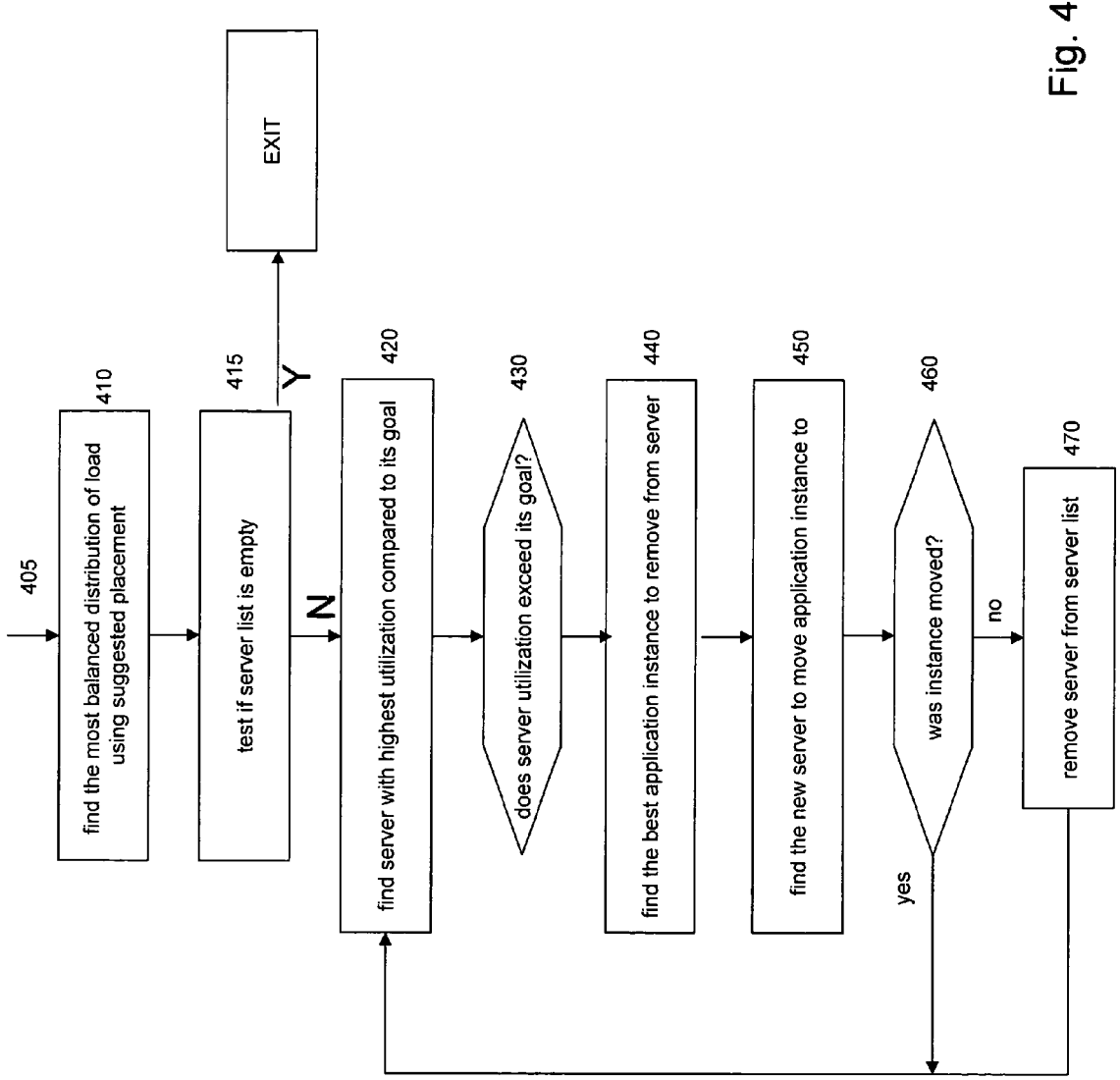
FIG. 4 illustrates the outline of rebalancing phase of the algorithm.

The list of all inputs to the placement algorithm is shown in FIG. 4 (1). The placement problem is to find matrix I, where $I_{mn}$ is the number of instances of application m that may be started on server n such that (1) minimum and maximum policies of all applications are observed, (2) allocation restrictions are observed, (3) load-independent capacity limits are observed, and (4) it is possible to allocate load of all dynamic clusters to instances without exceeding per-instance allocation limits and load-dependent capacity limits. If a previous placement matrix $I^o$ exists, we also want to minimize the number of changes between the old and the new matrix. If it is not possible to satisfy the entire demand of applications, we aim at maximizing the amount of satisfied demand. Finally, among all placements that maximize the amount of satisfied demand, we want to find one that allows the load allocated to nodes to be balanced.

Since we are dealing with multiple optimization objectives, we prioritize them in the formal statement of the problem as follows:

$$\max \Sigma_m \Sigma_n L_{m,n} \quad \text{(i)}$$

$$\min \Sigma_m \Sigma_n |I_{m,n}^o - I_{m,n}| \quad \text{(ii)}$$

$$\max U(I) \quad \text{(iii)}$$

where U is a measure of placement utility with respect to load balancing, subject to:

$$\forall_n \Sigma_m I_{m,n} \gamma_m \leq \Gamma_n \quad (1)$$

$$\forall_n \Sigma_m L_{m,n} \leq \Omega_n \quad (2)$$

$$\forall_m \Sigma_n L_{m,n} \leq \omega_m \quad (3)$$

$$\forall_m \forall_n L_{m,n} \leq I_{m,n} \pi_{m,n} \quad (4)$$

$$\forall_m \forall_n R_{m,n} = \text{false} \rightarrow I_{m,n} = 0 \quad (5)$$

$$\forall_m \min_m \leq \Sigma_n I_{m,n} \leq \max_m \quad (6)$$

$$\forall_m \text{managed}_m = \text{false} \rightarrow \forall_n I_{m,n} = I_{m,n}^o \quad (7)$$

Placement algorithm consists of two stages. In the first stage, a suggested placement is calculated that satisfies objectives (i) and (ii) (FIG. 4 (1)). Then, the suggested placement is modified such that objective (iii) is satisfied also (FIG. 4 (2)).

The suggested placement may be calculated using many procedures known to skilled in the art. After the suggested placement is found, we re-balance it in order to maximize U(I) in such a way that:

1. The total amount of satisfied demand remains unchanged
2. The number of placement changes compared to previous placement does not increase.

Re-balancing placement consists of the following steps that may or may not be repeated as needed, as shown in FIG. 4:

1. Assess the goodness of the suggested placement (410)
2. Choose the list of triples (application, server of origin, destination server) of replacement decisions and replace applications, which may be done as follows:
    a. Find a server with the highest utilization compared to the perfect result (420)
    b. Test if server utilization exceeds the goal (430)
    c. If server utilization exceeds the goal, find the best application instance to remove from the server (440)
    d. Find the best server where to move the application instance to (450)
    e. If no instance may be moved from the server, remove server from server list (470) and return to step (420)
    f. Repeat until server list is empty (405)

Placement Utility with Respect to Load Balancing

Function U(I) represents the goodness of placement with respect to load allocation, and may be defined in multiple ways. We focus on the ability of the placement to facilitate load balancing by a request router. The optimal placement is such that the request router can perfectly balance the load across all servers using its load balancing policy. Other load allocation preferences could be considered. For example, one may prefer a load to be clustered on as few servers as possible to allow some servers to be turned off. The rest of this document discusses a solution that attempts to balance load across all servers in a way that utilized each server to a desired degree. The utilization target for each server n is denoted by $\rho_n$. Let $L^*_{m,n}$ be load distribution matrix resulting from the suggested placement. We can express the utility of placement I as follows:

$$U(I) = -\min \sum_n \left( \frac{\sum_m L_{m,n}}{\Omega_n} - \rho_n \right)^2$$

Subject to:

$$\forall_n \Sigma_m L_{m,n} \leq \Omega_n \quad (1)$$

$$\forall_m \Sigma_n L_{m,n} = \Sigma_n L^*_{m,n} \quad (2)$$

$$\forall_m \forall_n L_{m,n} \leq I_{m,n} \pi_{m,n} \quad (3)$$

In homogeneous clusters we usually want $$\rho_n = \rho = \frac{\sum_n \sum_m L_{m,n}}{\sum_n \Omega_n}.$$

Calculating Placement Utility with Respect to Load Balancing

To calculate the utility of placement with respect to load balancing one has to solve the nonlinear optimization problem outlined in the preceding paragraph. We adopt the following technique of solving this problem. First, we formulate an auxiliary optimization problem, AO, which is formulated as follows:

$$\min \Sigma_n |\Sigma_m L_{m,n} - \rho_n \Omega_n|$$

Subject to:

$$\forall_n \Sigma_m L_{m,n} \leq \Omega_n \quad (1)$$

$$\forall_m \Sigma_n L_{m,n} = \Sigma_n L^*_{m,n} \quad (2)$$

$$\forall_m \forall_n L_{m,n} \leq I_{m,n} \pi_{m,n} \quad (3)$$

Where $L^*_{m,n}$ is the load distribution matrix resulting from the suggested placement.

Optimization AO is a minimum cost flow problem outlined in FIG. 5, which is structured as follows. We form a network of vertices, with source vertex (500), application vertices (510, 520, 530), server vertices (511, 521, 531), ideal server vertices (512, 522, 532), rebalancing vertex (540), and sink vertex (540). Source (500) has outbound edges to all application vertices 510, 520, 530), where the capacity of the edge from source to an application is equal to load-dependent requirement of the application and its cost is equal to 0. Each application vertex has an outbound edge to a vertex representing each server that the application is placed on. The capacity of such an edge is equal to the total amount of demand that may be placed on this server for the application, which results from allocation limits and the number of instances of the applications that run on the server. The cost of the edge is zero. Each server vertex has an outbound edge to the ideal server vertex that corresponds to the same physical server machine. The capacity of the edge is equal to the desired load-dependent capacity usage of the server. Rebalancing vertex (540) has inbound edges from server vertices, whose capacity is equal to the difference between the total capacity of the corresponding server and its desired capacity usage. The cost of these inbound vertices is one. The rebalancing vertex also has outbound edges to ideal server vertices, where each such edge has the capacity equal to the desired load-dependent capacity usage of the corresponding physical server, and the cost of one. Finally, all ideal server vertices have an outbound edge to the sink vertex (550) each, with capacity limit equal to the desired load-dependent capacity usage and the cost of zero.

Figure 5:
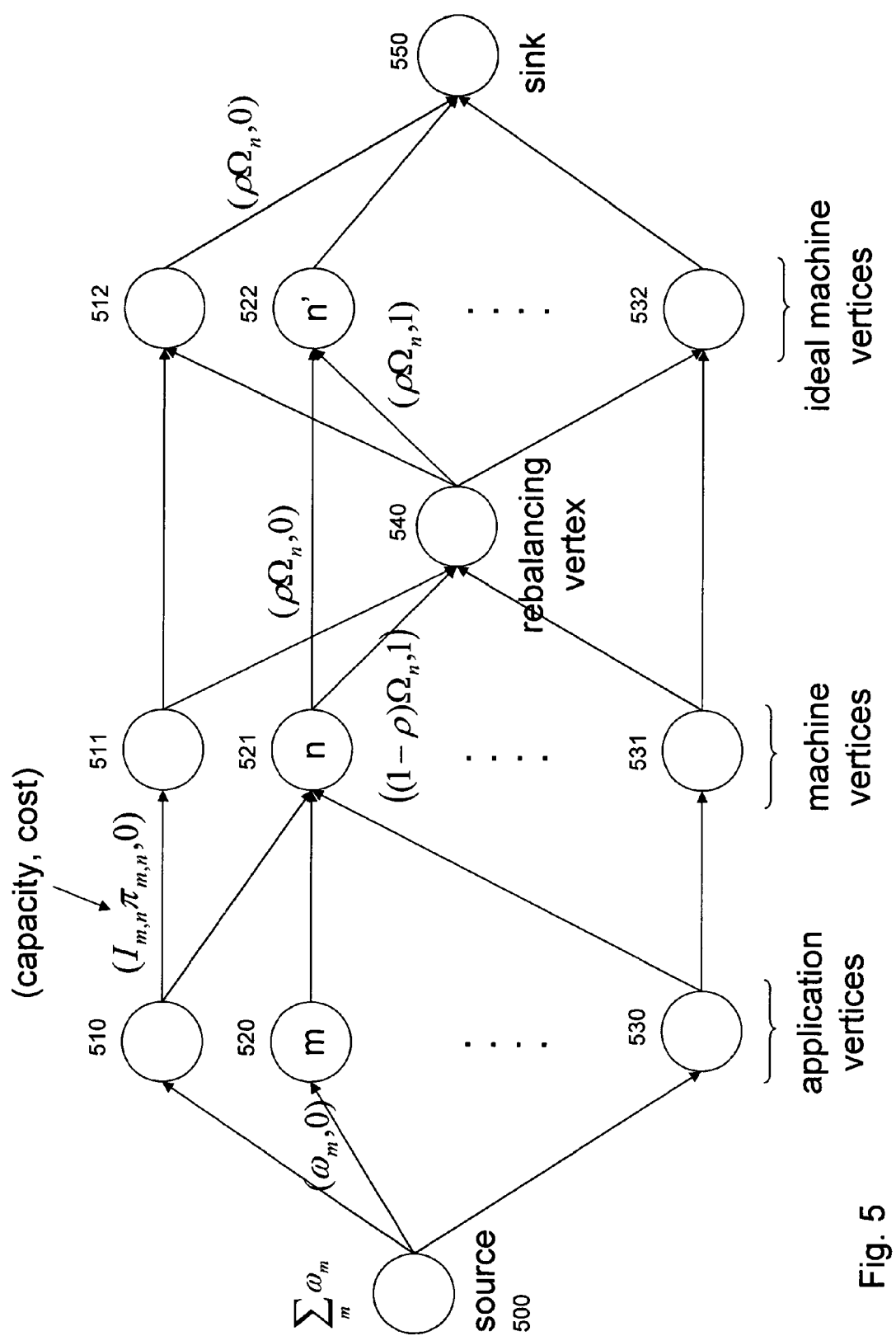
FIG. 5 shows a formulation of a minimum cost flow problem used as part of a solution.

Optimization problem AO illustrated in FIG. 5 may be solved {is 'shown' the right word? do you mean 'solved', or something else?} using techniques known to the skilled in the art. When AO produces 0 as a result, its also solves the nonlinear optimization required for the calculation of placement utility. Otherwise, it may or may not produce the optimal solution to the nonlinear problem. The resultant load distribution matrix L may be used to classify servers into three types:
 1. Overloaded servers, $N^o = \{n: \Sigma_m L_{m,n} > \rho_n \Omega_n\}$
 2. Underloaded servers, $N^u = \{n: \Sigma_m L_{m,n} < \rho_n \Omega_n\}$
 3. Balanced servers, $N^b = \{n: \Sigma_m L_{m,n} = \rho_n \Omega_n\}$ In the perfect solution, $N^b = N$ and $N^o = N^u = \emptyset$. Otherwise, AO optimally divides demand among the three sets in a sense that it is not possible to produce a better matrix L, by transferring some demand from $N^o$ to $N^u$. However, within each $N^o$ and $N^u$, load may be unbalanced. To produce an optimally balanced load distribution matrix we need to run AO in $N^o$ and $N^u$. Hence, we can solve the optimal load balance iteratively by applying AO to smaller and smaller sets of servers.

Figure 6:
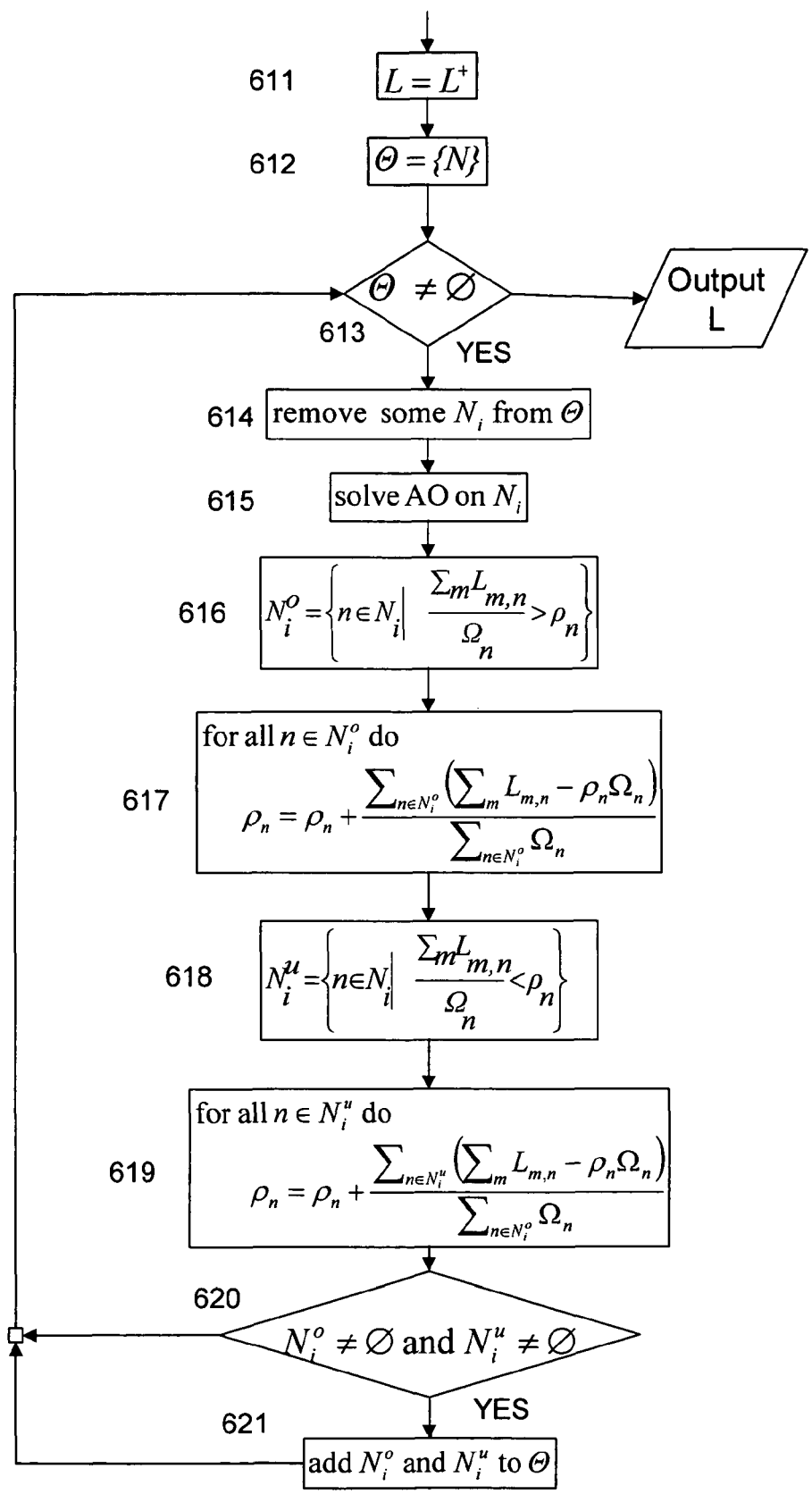
FIG. 6 shows an algorithm used to calculate an optimal load distribution for a given placement.

This results in the procedure outlined in FIG. 6, which proceeds as follows:
 1. Copy the result of suggested placement into new load distribution matrix L (611)
 2. Initialize set $\Theta = \{N\}$. (612)
 3. Test if $\Theta$ is empty (613). Initially, $\Theta$ is non-empty, according to initialization in step 2. During the procedure, $\Theta$ may grow or shrink. Eventually, it becomes empty. If $\Theta$ is non-empty, go to step (614). Otherwise, proceed to exit while returning the current matrix L.
 4. Take any element $N_i$ out of $\Theta$. $N_i$ is a subset of all servers in the system. (614)
 5. Solve optimization AO over set $N_i$ (615). The optimization only considers columns of all input matrices that correspond to servers in $N_i$.
 6. Determine the set of overloaded servers, $N_i^o$. (616)
 7. For all overloaded servers, recalculate their utilization targets. (618)
 8. Determine the set of underloaded servers, $N_i^u$. (618)
 9. For all underloaded servers, recalculate their utilization targets. (619)
 10. Test if both $N_i^o$ and $N_i^u$ are non-empty (620). Note that either both $N_i^o$ and $N_i^u$ must be non-empty or both $N_i^o$ and $N_i^u$ are empty. Other configurations are not possible.
 11. If both $N_i^o$ and $N_i^u$ are non-empty, add them to $\Theta$ (621) and return to step (613).

The procedure described above requires the optimization AO to be solved at most n times.

Rearranging Placement to Improve its Utility with Respect to Load Balancing

The suggested placement is rearranged according to the following routine.
 1. Initialize the current placement to the suggested placement
 2. Calculate load distribution that maximizes the utility given the current placement 3. Identify the most profitable change, that is a triple (application, current node, destination node). The change is the most profitable if moving the application from the current node to the destination node produces the greatest improvement of utility
4. Repeat steps 2 and 3 until no more changes can be made.

Identifying the Most Profitable Change

We introduce the following definitions:
1. The set of applications whose instances may be stopped on server n.

$$M_n^r = \{m \in M; I_{m,n} > I_{m,n}^o\}$$

2. For server n and application $m \in M_n^r$, the minimum demand that must be transferred out of n to allow one instance of application m to be stopped on n.

$$\delta_{min}(m, n) = L_{m,n} - \pi_{m,n}(I_{m,n} - 1)$$

3. For server n and application $m \in M_n^r$, the maximum demand that may be transferred out of n in order not to increase the distance of server n from its utilization target of $\rho_n$ $$\delta_{max}^{out}(m, n) = \begin{cases} \min(L_{m,n}, \pi_{m,n} + \delta_{min}(m, n), \\ \quad 2(L_{m,n} - \rho_n \Omega_n)) & \text{if } L_{m,n} > \rho_n \Omega_n \\ 0 & \text{otherwise} \end{cases}$$

4. For server n, we define the set of applications that may be transferred to it.

$$M_n^a = \{m \in M; \gamma_m + \Sigma_{m'} I_{m',n} \gamma_{m'} \leq \Gamma_m \wedge R_{m,n} = \text{true}\}$$

5. For server n, we define the maximum demand that may be transferred to n from another server without increasing that server's distance from its utilization target of $\rho_n$ $$\delta_{max}^{in}(m, n) = \begin{cases} \min((I_{m,n}+1)\pi_{m,n} - L_{m,n}, \Omega_n - & \text{if } m \in M_n^a \wedge \\ \quad L_{m,n}, 2(\rho_n \Omega_n - L_{m,n})) & \sum_{m'} L_{m',n} \leq \rho_n \Omega_n \\ 0 & \text{otherwise} \end{cases}$$

6. For a triple $(m, n_1, n_2)$ we define the maximum amount of demand of application m that may be transferred from $n_1$ to $n_2$ $$\delta_{max}(m, n_1, n_2) = \min(\delta_{max}^{out}(m, n_1), \delta_{max}^{in}(m, n_2))$$

7. For a pair $(m, n_1, n_2)$ we define the desired amount of demand that should be transferred from server $n_1$ to server $n_2$ $$\delta^{opt}(n_1, n_2) = \begin{cases} \min\left(\sum_m L_{m,n_1} - \rho_{n_1}\Omega_{n_1}, \rho_{n_2}\Omega_{n_2} - \sum_m L_{m,n_2}\right) & \text{if } \Omega_{n_1} > \Omega_{n_2} \\ \max\left(\sum_m L_{m,n_1} - \rho_{n_1}\Omega_{n_1}, \rho_{n_2}\Omega_{n_2} - \sum_m L_{m,n_2}\right) & \text{otherwise} \end{cases}$$

8. For a triple $(m, n_1, n_2)$ we define the amount of demand of application m that should be transferred if application m is moved from $n_1$ to $n_2$ $$\delta(m, n_1, n_2) = \begin{cases} \min(\max(\delta^{opt}(n_1, n_2), \delta_{min}(m, n)), \\ \quad \delta_{max}(m, n_1, n_2)) & \text{if } \delta_{max}(m, n_1, n_2) > \delta_{min}(m, n_1) \\ 0 & \text{otherwise} \end{cases}$$

To identify the most profitable change, we select server $n_1$ such that $$\frac{\sum_m L_{m,n_1}}{\Omega_{n_1}} - \rho_{n_1}$$

is maximum. Then, we select a pair $(m, n_2)$ that solves the following optimization $$\min_{(m,n_2) \in M_{n_1}^r \times N} \left| \frac{\sum_{m'} L_{m',n_1} - \delta(m, n_1, n_2)}{\Omega_{n_1}} - \rho_{n_1} \right| + \left| \frac{\sum_{m'} L_{m',n_2} + \delta(m, n_1, n_2)}{\Omega_{n_2}} - \rho_{n_2} \right|$$

If $$\left| \frac{\sum_{m'} L_{m',n_1} - \delta(m, n_1, n_2)}{\Omega_{n_1}} - \rho_{n_1} \right| + \left| \frac{\sum_{m'} L_{m',n_2} + \delta(m, n_1, n_2)}{\Omega_{n_2}} - \rho_{n_2} \right| < \left| \frac{\sum_{m'} L_{m',n_1}}{\Omega_{n_1}} - \rho_{n_1} \right| + \left| \frac{\sum_{m'} L_{m',n_2}}{\Omega_{n_2}} - \rho_{n_2} \right|$$

then moving $\delta(m, n_1, n_2)$ demand of application m from $n_1$ to $n_2$ improves the placement utility.

Moving an Instance Between Servers

Once the most profitable triple $(m, n_1, n_2)$ is chosen, we execute it as follows:
1. We stop one instance of m on server $n_1$ and remove $\delta(m, n_1, n_2)$ demand from $n_1$, which corresponds to setting $I_{m,n_1} = I_{m,n_1} - 1$ and $L_{m,n_1} = L_{m,n_1} - \delta(m, n_1, n_2)$
2. We start one instance of m on server $n_2$ and add $\delta(m, n_1, n_2)$ demand to $n_2$, which corresponds to setting $I_{m,n_2} = I_{m,n_2} + 1$ and $L_{m,n_2} = L_{m,n_2} + \delta(m, n_1, n_2)$ Exit Criteria We continue moving the most profitable triples until the following conditions are met:
1. There exists server $n_1$ such that $\Sigma_m L_{m,n_1} > \rho_{n_1}\Omega_{n_1}$
2. There exists application $m \in M_{n_1}^r$
3. There exists server $n_2$ such that $$\left| \frac{\sum_{m'} L_{m',n_1} - \delta(m, n_1, n_2)}{\Omega_{n_1}} - \rho_{n_1} \right| + \left| \frac{\sum_{m'} L_{m',n_2} + \delta(m, n_1, n_2)}{\Omega_{n_2}} - \rho_{n_2} \right| < \left| \frac{\sum_{m'} L_{m',n_1}}{\Omega_{n_1}} - \rho_{n_1} \right| + \left| \frac{\sum_{m'} L_{m',n_2}}{\Omega_{n_2}} - \rho_{n_2} \right|$$

This results in a solution which dynamically places the set of applications on the cluster of servers. The solution relies on the knowledge of application demands and resource capacities categorized as being either load-dependent or load-independent. The calculated placement is such that the total amount of satisfied application demands is maximized, the number of placement changes compared to the current placement is minimized, and the resultant placement allowed for the best load distribution. The calculated placement is also such that the amount of load dependent and load independent capacity consumed by applications placed on a server does not exceed the overall load dependent and load independent capacity of the server. The method respects allocation restrictions defined for any application on any server and allocation limits also defined for any application on any server.

Thus the invention includes a method for placement of applications. The method including: dynamically placing applications on at least one server includes the steps of: obtaining the current placement of the applications; computing a suggested new placement that maximizes the total amount of satisfied demands while minimizing the number of placement changes, modifying the suggested placement in forming an updated placement to minimize the imbalance of load distribution of the applications without lowering the total amount f satisfied demands and without increasing the number of placement changes, and executing placement changes on the current placement to effect the updated placement.

In some embodiments of the method, the method includes: computing a set of placement changes needed to convert the current placement into the updated placement; and/or the step of obtaining comprises: observing applications on each of the at least one server, and recording a status of each of the applications on each of the at least one server; and/or the step of computing comprises: initializing a best placement to be the current placement, finding a best allocation of capacity to each of the applications using the current placement, calculating residual capacities of each of the at least one server and residual demands of each of the applications, calculating a residual placement of the residual demands using the residual capacities, combining the residual placement with the current placement to obtain a combined placement, substituting the combined placement to be the best placement if the combined placement is better than the best placement, if all residual demands are satisfied, making the best placement to be the suggested placement, otherwise removing at least one application instance from the current placement and repeating the steps of finding, calculating residual capacities, calculating a residual placement, combining, and substituting until all residual demands are satisfied or no more application instances may be removed from the current placement, when no application instance may be removed from the current placement, choosing the best placement to be the suggested placement.

In some embodiments of the method, the step of modifying includes: initializing utilization goal of at least one server to correspond to a hypothetical distribution of demand that maximizes a goodness of complete placement of the applications with respect to load balancing; initializing a server set to comprise the at least one server; finding a distribution of the application demands using the suggested placement that maximizes a goodness of placement of the applications with respect to load balancing; finding a particular server having a highest utilization in the most balanced distribution of the application demands compared to the utilization goal of the particular server; if the highest utilization exceeds the utilization goal of the particular server, finding a best application instance to remove from the particular server, finding a best new server to which to move the best application instance, and moving the best application instance from the particular server to the new server; if no best application instance is found, removing the particular server from the server list; and repeating the steps of finding server, finding a best application, finding a best server, moving, and removing until the server set is empty.

In some embodiments of the method, the complete placement includes at least one instance of each of the applications on each the at least one server whenever an allocation restriction flag for the each of the applications on each the at least one server is not set to false; and/or a number of the application instances of each of the applications on each the at least one server is such that each of the applications can use the entire capacity of each the at least one server.

In some embodiments of the method, the step of executing include: calculating a set of placement changes required to transform the current placement into the updated placement; and/or the step of finding a best application instance to remove, excludes removing applications that are predetermined not to be removable from the particular server, and excludes removing application instances the removal of which does not improve utilization of the particular server compared to the utilization goal of the particular server; and/or the step of finding the best new server to which to move the best application instance excludes finding a specific server such that the allocation restriction flag for the specific server and the best application is set to false, and excludes finding the specific server such that residual load-independent capacity of the specific server is lower than load-independent demand of the best application, and excludes finding the specific server such that the utilization of the specific server compared to utilization goal of the specific server worsens as a result of moving the best application to the specific server;

In some embodiments of the method, when a new instance of a specific application is created on a particular server, in the step of calculating a residual placement of the residual demands using the residual capacities, the amount of demand allocated to the new instance of the specific application is not allowed to exceed an allocation limit for the specific application on the particular server.

The invention includes an apparatus for placement of applications. The apparatus includes means for dynamically placing applications on at least one server. The means for dynamically placing includes: means for obtaining the current placement of the applications; means for computing a suggested new placement that maximizes the total amount of satisfied demands while minimizing the number of placement changes; means for modifying the suggested placement to minimize the imbalance of load distribution of the applications without lowering the total amount of satisfied demands and without increasing the number of placement changes, forming an updated placement; and means for executing placement changes on the current placement to effect the updated placement. In some embodiments, the apparatus includes means for performing the various functions of the method for application placement.

An alternate method of the invention for a application placement method includes providing placement of applications on a cluster of servers to facilitate load balancing. The step of providing comprising the steps of: obtaining a current placement of applications, computing a suggested new placement of applications, modifying the suggested placement in forming a computed placement by computing and replacing a set of triples such that moving an application in each triple from a server of origin of said application to a destination server maximizes utility of the computed placement with respect to load balancing, and executing the computed placement.

In some embodiments of the method, the set of triples comprises: application, server of origin, and destination server; and/or the step of computing and replacing the set of triples, excludes triples wherein the application in the said triple is predetermined not to be removed from the server of origin in said triple; and/or the step of computing and replacing the set of triples, excludes finding a triple wherein an allocation restriction flag for a specific destination server in said triple and specific application in said triple is set to false, and excludes finding a triple wherein residual load-independent capacity of the specific destination server in said triple is lower than load-independent demand of the specific application in said triple; and/or the step of computing and replacing a set of triples comprises the step of calculating a best amount of demand of a particular application in a particular triple that should be transferred from the server of origin of said particular application in the particular triple to a destination server in the particular triple; and/or the best amount of demand of the application in a particular triple to be transferred from the server of origin in the particular triple to the destination server in the particular triple is such that after transferring said best amount of demand from said particular server of origin to said particular destination server the goodness of computed placement with respect to load balancing is maximized; and/or the step of calculating the best amount of demand of the application in a particular triple that should be transferred from server of origin in the particular triple to the destination server in the particular triple, the capacity of the destination server in said particular triple allocated to the application in said particular triple after instance of said application in said particular triple is moved from server of origin in said particular triple to destination server in said particular triple does not exceed said allocation limit of said application in said particular triple on said server in said particular triple.

Another alternate method of the invention for an application placement method includes providing a set of servers and a set of applications; associating with each server n a load-independent capacity and a load-dependent capacity, said load-independent capacity corresponding to the server's memory, said load-dependent capacity corresponding to the server's CPU power; associating with each application: a load-independent demand value corresponding to the application's memory, and a load dependent demand value corresponding to CPU requirements, a minimum number of instances that must be started for the application, $\min_m$, a maximum number of instances that may be started for the application, $\max_m$; associating with each application and each server parameters: an allocation restriction flag, $R_{mn}$ indicating whether an instance of the application m may be started on server n, an allocation limit for application m instance on server n, $\pi_{mn}$ that indicates the maximum amount of CPU power that can be used by a single instance of application m on server n; obtaining application placement currently in effect; verifying if the placement currently in effect is sufficient to satisfy all application demands and respects all allocation restrictions and allocation limits; if the current placement does not meet the said criteria, finding a new matrix solution to placement problem where each matrix cell mn, includes a number of instances of application m that may be started on server n such that: minimum and maximum policies of all applications are observed, allocation restrictions are observed, load-independent capacity limits are observed, and it is possible to allocate load of all dynamic clusters to instances without exceeding per-instance allocation limits and load-dependent capacity limits; when a previous matrix exists, maximizing the total amount of satisfied application demand is maximized; when more than one previous placement matrix exists, minimizing a number of changes between the previous and the new matrix; when more than one previous matrix exists, finding a matrix that maximizes the amount of allows a load allocated to servers to be balanced; and when said matrix is found, executing the set of placement changes required to transform the current placement matrix into the calculated placement matrix.

Still another alternate method of the invention for a application placement method includes finding a new matrix solution to placement problem where each matrix cell mn, includes a number of instances of application m that may be started on server n such that: minimum and maximum policies of all applications are observed, allocation restrictions are observed, load-independent capacity limits are observed, and it is possible to allocate load of all dynamic clusters to instances without exceeding per-instance allocation limits and load-dependent capacity limits; prioritizing candidate placement solutions according to a measure of placement utility; calculating a suggested placement satisfying preliminary placement objectives; modifying the suggested placement such that an additional placement objective is satisfied; and re-balancing the suggested placement such as to maximize a goodness of placement with respect to load allocation such that a total amount of satisfied demand remains unchanged and a number of placement changes compared to a previous placement does not increase.

In some embodiments of the method, the method includes at least one limitation taken from a group of limitations including: the step of re-balancing placement include; at least one implementation of steps of: assessing the goodness of the suggested placement, and choosing a list of triples of replacement decisions and replace applications; the list of triples includes application, server of origin, and destination server; the goodness of placement includes focusing on an ability of the placement to facilitate load balancing by a request router, wherein optimal placement is such that the request router can perfectly balance the load across all servers using its load balancing policy; the goodness of placement includes loading clustered on as few servers as possible to allow some servers to be turned off; further comprising calculating placement utility with respect to load balancing, identifying a most profitable change and moving an instance between servers.

It is noted that there are several alternative implementations. These include for example, the usage of a different algorithm to compute the suggested placement, the usage of a different technique to obtain load distribution that maximizes the goodness of application placement with respect to load balancing, and different definition of placement goodness with respect to load balancing. Alternative techniques to solve these problems are known to those skilled in the art.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

We claim:

1. A method for placement of applications comprising:
dynamically placing applications on at least one server to:
maximize a total amount of satisfied application demands, minimize a number of placement changes from a current placement, and minimize imbalance of load distribution of said applications on said at least one server, the step of dynamically placing comprising the steps of:
obtaining the current placement of the applications;
computing a suggested new placement that maximizes the total amount of satisfied demands while minimizing the number of placement changes;
modifying the suggested placement in forming an updated placement to minimize the imbalance of load distribution of said applications without lowering the total amount of satisfied demands and without increasing the number of placement changes; and
executing placement changes on said current placement to effect said updated placement.

2. A method for placement of applications as recited in claim 1, further comprising computing a set of placement changes needed to convert the current placement into the updated placement.

3. A method for placement of applications as recited in claim 1, wherein the step of obtaining comprises:
observing applications on each of said at least one server, and recording a status of each of said applications on each of said at least one server.

4. A method for placement of applications as recited in claim 1, wherein the step of computing comprises:
initializing a best placement to be the current placement;
finding a best allocation of capacity to each of said applications using the current placement;
calculating residual capacities of each of said at least one server and residual demands of each of said applications;
calculating a residual placement of said residual demands using said residual capacities;
combining said residual placement with said current placement to obtain a combined placement;
substituting said combined placement to be said best placement if said combined placement is better than said best placement if all residual demands are satisfied, making said best placement to be said suggested placement, otherwise removing at least one application instance from the said current placement and repeating the steps of finding, calculating residual capacities, calculating a residual placement, combining, and substituting until all residual demands are satisfied or no more application instances may be removed from said current placement;
when no application instance may be removed from the said current placement, choosing said best placement to be said suggested placement.

5. A method for placement of applications as recited in claim 4, wherein when a new instance of a specific application is created on a particular server, in the step of calculating a residual placement of said residual demands using said residual capacities the amount of demand allocated to the new instance of the specific application is not allowed to exceed an allocation limit for the specific application on the particular server.

6. A method for placement of applications as recited in claim 4, the best amount of demand allocated to said best application instance that should be moved from said particular server to said best new server is such that after transferring said best amount of demand from said particular server to said best new server the goodness of computed placement with respect to load balancing is maximized.

7. A method for placement of applications as recited in claim 4, in the step of calculating the best amount of demand allocated to said best application instance that should be moved from said particular server to said best new server, the capacity of said best new server allocated to said best application instance after said best application instance is moved from said particular server to said best new server does not exceed said allocation limit of said application on said best new server.

8. A method for placement of applications as recited in claim 1, wherein the step of modifying comprises:
initializing utilization goal of each said at least one server to correspond to a hypothetical distribution of demand that maximizes a goodness of complete placement of said applications with respect to load balancing;

initializing a server set to comprise said at least one server;

finding a distribution of said application demands using said suggested placement that maximizes a goodness of placement of said applications with respect to load balancing;

finding a particular server having a highest utilization in said most balanced distribution of said application demands compared to the utilization goal of said particular server;

if said highest utilization exceeds said utilization goal of said particular server, finding a best application instance to remove from said particular server, finding a best new server to which to move said best application instance, calculating the best amount of demand allocated to said best application instance that should be moved from said particular server to said best new server, and moving said best application instance from said particular server to said new server;

if no best application instance is found, removing said particular server from said server list; and repeating the steps of finding server, finding a best application, finding a best server, calculating, moving, and removing until said server set is empty.

9. A method for placement of applications as recited in claim 8, wherein said complete placement includes at least one instance of each of said applications on each said at least one server whenever an allocation restriction flag for said each of said applications on each said at least one server is not set to false.

10. A method for placement of applications as recited in claim 9, wherein a number of said application instances of each of said applications on each said at least one server is such that each of said applications can use the entire capacity of each said at least one server.

11. A method for placement of applications as recited in claim 8, wherein the step of finding a best application instance to remove, excludes removing applications that are predetermined not to be removable from said particular server, and excludes removing application instances the removal of which does not improve utilization of said particular server compared to said utilization goal of said particular server.

12. A method for placement of applications as recited in claim 8, wherein the step of finding the best new server to which to move said best application instance excludes finding a specific server such that said allocation restriction flag for the specific server and said best application is set to false, and excludes finding the specific server such that residual load-independent capacity of the specific server is lower than load-independent demand of said best application, and excludes finding the specific server such that the utilization of the specific server compared to utilization goal of said specific server worsens as a result of moving said best application to the specific server.

13. A method for placement of applications as recited in claim 1, wherein the step of executing comprises:

calculating a set of placement changes required to transform said current placement into said updated placement.

14. An article of manufacture comprising a non-transitory computer usable medium having computer readable program code means embodied therein for causing placement of applications, the computer readable program code means in said article of manufacture comprising computer readable program code means for causing a computer to effect the steps of claim 1.

15. A program storage device readable by machine, tangibly embodying a program of instructions executable by the machine to perform method steps for causing placement of applications, said method steps comprising the steps of claim 1.

16. An apparatus to place applications comprising:

means for dynamically placing applications on at least one server to:

maximize a total amount of satisfied application demands, minimize a number of placement changes from a current placement, and minimize imbalance of load distribution of said applications on said at least one server, the means for dynamically placing comprising:

means for obtaining the current placement of the applications;

means for computing a suggested new placement that maximizes the total amount of satisfied demands while minimizing the number of placement changes;

means for modifying the suggested placement in forming an updated placement to minimize the imbalance of load distribution of said applications without lowering the total amount of satisfied demands and without increasing the number of placement changes; and means for executing placement changes on said current placement to effect said updated placement.

17. An apparatus for placement of applications as recited in claim 16, further comprising means for computing a set of placement changes needed to convert the current placement into the updated placement.

18. An apparatus for placement of applications as recited in claim 16, wherein the means for obtaining comprises:

means for observing applications on each of said at least one server; and means for recording a status of each of said applications on each of said at least one server.

19. An apparatus for placement of applications as recited in claim 16, wherein means for computing comprises:

means for initializing a best placement to be the current placement;

means for finding a best allocation of capacity to each of said applications using the current placement;

means for calculating residual capacities of each of said at least one server and residual demands of each of said applications;

means for calculating a residual placement of said residual demands using said residual capacities;

means for combining said residual placement with said current placement to obtain a combined placement;

means for substituting said combined placement to be said best placement if said combined placement is better than said best placement if all residual demands are satisfied, employing means for making said best placement to be said suggested placement, otherwise employing means for removing at least one application instance from the said current placement and repeating the steps of finding, means for calculating residual capacities, means for calculating a residual placement, combining, and means for substituting until all residual demands are satisfied or no more application instances may be removed from said current placement;

when no application instance may be removed from the said current placement, means for choosing said best placement to be said suggested placement.

20. An apparatus for placement of applications as recited in claim 16, wherein means for modifying comprises:

means for initializing utilization goal of each said at least one server to correspond to a hypothetical distribution of demand that maximizes a goodness of complete placement of said applications with respect to load balancing;

means for initializing a server set to comprise said at least one server;

means for finding a distribution of said application demands using said suggested placement that maximizes a goodness of placement of said applications with respect to load balancing;

means for finding a particular server having a highest utilization in said most balanced distribution of said application demands compared to the utilization goal of said particular server;

if said highest utilization exceeds said utilization goal of said particular server, means for finding a best application instance to remove from said particular server, means for finding a best new server to which to move said best application instance, and means for moving said best application instance from said particular server to said new server;

if no best application instance is found, means for removing said particular server from said server list; and repeating the steps of finding server, finding a best application, finding a best server, moving, and removing until said server set is empty.

21. An apparatus for placement of applications as recited in claim 20, further comprising at least one limitation taken from a group of limitations consisting of said complete placement includes at least one instance of each of said applications on each said at least one server whenever an allocation restriction flag for said each of said applications on each said at least one server is not set to false;

a number of said application instances of each of said applications on each said at least one server is such that each of said applications can use the entire capacity of each said at least one server;

the means for executing comprises means for calculating a set of placement changes required to transform said current placement into said updated placement;

the means for finding a best application instance to remove, excludes removing applications that are predetermined not to be removable from said particular server, and excludes removing application instances the removal of which does not improve utilization of said particular server compared to said utilization goal of said particular server;

the means for finding the best new server to which to move said best application instance excludes finding a specific server such that said allocation restriction flag for the specific server and said best application is set to false, and excludes finding the specific server such that residual load-independent capacity of the specific server is lower than load-independent demand of said best application, and excludes finding the specific server such that the utilization of the specific server compared to utilization goal of said specific server worsens as a result of moving said best application to the specific server; and when a new instance of a specific application is created on a particular server, in the means for calculating a residual placement of said residual demands using said residual capacities the amount of demand allocated to the new instance of the specific application is not allowed to exceed an allocation limit for the specific application on the particular server.

22. A computer program product comprising a non-transitory computer usable medium having computer readable program code means embodied therein for causing placement of applications, the computer readable program code means in said computer program product comprising computer readable program code means for causing a computer to effect the functions of claim 16.

23. A application placement method, comprising providing placement of applications on a cluster of servers to facilitate load balancing, the step of providing comprising the steps of:
    obtaining a current placement of applications;
    computing a suggested new placement of applications;
    modifying the suggested placement in forming a computed placement by computing and replacing a set of triples such that moving an application in each triple from a server of origin of said application to a destination server maximizes utility of the computed placement with respect to load balancing; and
    executing the computed placement.

24. A method for placement of applications as recited in claim 23, wherein the set of triples comprises application, server of origin, and destination server.

25. A method for placement of applications as recited in claim 23, wherein the step of computing and replacing the set of triples, excludes triples wherein the application in the said triple is predetermined not to be removed from the server of origin in said triple.

26. A method for placement of applications as recited in claim 23, wherein the step of computing and replacing the set of triples, excludes finding a triple wherein an allocation restriction flag for a specific destination server in said triple and specific application in said triple is set to false, and excludes finding a triple wherein residual load-independent capacity of the specific destination server in said triple is lower than load-independent demand of the specific application in said triple.

27. A method for placement of applications as recited in claim 23, wherein the step of computing and replacing a set of triples comprises the step of calculating a best amount of demand of a particular application in a particular triple that should be transferred from the server of origin of said particular application in the particular triple to a destination server in the particular triple.

28. A method for placement of applications as recited in claim 27, wherein the best amount of demand of the application in a particular triple to be transferred from the server of origin in the particular triple to the destination server in the particular triple is such that after transferring said best amount of demand from said particular server of origin to said particular destination server the goodness of computed placement with respect to load balancing is maximized.

29. A method for placement of applications as recited in claim 27, wherein in the step of calculating the best amount of demand of the application in a particular triple that should be transferred from server of origin in the particular triple to the destination server in the particular triple, the capacity of the destination server in said particular triple allocated to the application in said particular triple after instance of said application in said particular triple is moved from server of origin in said particular triple to destination server in said particular triple does not exceed said allocation limit of said application in said particular triple on said server in said particular triple.

30. A program storage device readable by machine, tangibly embodying a program of instructions executable by the machine to perform method steps for application placement, said method steps comprising the steps of claim 23.

31. An article of manufacture comprising a non-transitory computer usable medium having computer readable program code means embodied therein for causing application placement, the computer readable program code means in said article of manufacture comprising computer readable program code means for causing a computer to effect the steps of claim 23.

32. An application placement method comprising:
providing a set of servers and a set of applications,
associating with each server n a load-independent capacity and a load-dependent capacity, said load-independent capacity corresponding to the server's memory, said load-dependent capacity corresponding to the server's CPU power;
associating with each application:
a load-independent demand value corresponding to the application's memory,
and a load dependent demand value corresponding to CPU requirements,
a minimum number of instances that must be started for the application, $min_m$
a maximum number of instances that may be started for the application, $max_m$;
associating with each application and each server parameters:
an allocation restriction flag, $R_{mn}$ indicating whether an instance of the application m may be started on server n,
an allocation limit for application m instance on server n, $\pi_{mn}$ that indicates the maximum amount of CPU power that can be used by a single instance of application m on server n;
obtaining application placement currently in effect;
verifying if the placement currently in effect is sufficient to satisfy all application demands and respects all allocation restrictions and allocation limits;
if the current placement does not meet the said criteria,
finding a new matrix solution to placement problem where each matrix cell mn, includes a number of instances of application m that may be started on server n such that:
minimum and maximum policies of all applications are observed,
allocation restrictions are observed,
load-independent capacity limits are observed, and
it is possible to allocate load of all dynamic clusters to instances without exceeding per-instance allocation limits and load-dependent capacity limits;
when a previous matrix exists, maximizing the total amount of satisfied application demand is maximized;
when more than one previous placement matrix exists, minimizing a number of changes between the previous and the new matrix;
when more than one previous matrix exists, finding a matrix that maximizes the amount of allows a load allocated to servers to be balanced; and
when said matrix is found, executing the set of placement changes required to transform the current placement matrix into the calculated placement matrix.

33. A program storage device readable by machine, tangibly embodying a program of instructions executable by the machine to perform method steps for application placement, said method steps comprising the steps of claim 32.

34. A computer-implemented method for application placement comprising:
finding a new matrix solution to placement problem where each matrix cell mn, includes a number of instances of application m that may be started on server n such that:
minimum and maximum policies of all applications are observed,
allocation restrictions are observed,
load-independent capacity limits are observed, and
it is possible to allocate load of all dynamic clusters to instances without exceeding per-instance allocation limits and load-dependent capacity limits;
prioritizing candidate placement solutions according to a measure of placement utility;
calculating a suggested placement satisfying preliminary placement objectives;
modifying the suggested placement such that an additional placement objective is satisfied; and
re-balancing the suggested placement such as to maximize a goodness of placement with respect to load allocation such that a total amount of satisfied demand remains unchanged and a number of placement changes compared to a previous placement does not increase.

35. A method as recited in claim 34, further comprising at least one limitation taken from a group of limitations consisting of:
assessing the goodness of the suggested placement, and choosing a list of triples of replacement decisions and replace applications;
the list of triples includes application, server of origin, and destination server;
the goodness of placement includes focusing on an ability of the placement to facilitate load balancing by a request router, wherein optimal placement is such that the request router can perfectly balance the load across all servers using its load balancing policy; and
the goodness of placement includes loading clustered on as few servers as possible to allow some servers to be turned off.

36. An article of manufacture comprising a non-transitory computer usable medium having computer readable program code means embodied therein for causing application placement, the computer readable program code means in said article of manufacture comprising computer readable program code means for causing a computer to effect the steps of claim 34.

* * * * *